UNITED STATES PATENT OFFICE.

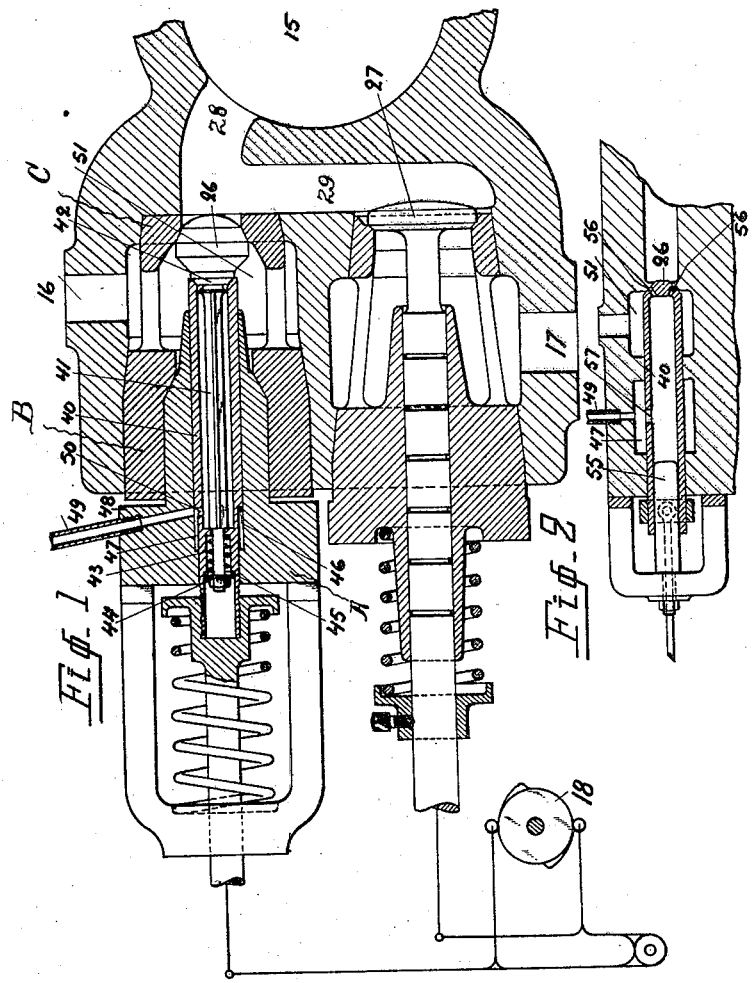

SVEN GUSTAF WIGELIUS, OF ESKILSTUNA, SWEDEN.

GAS-MOTOR.

997,887.

Specification of Letters Patent. Patented July 11, 1911.

Original application filed February 9, 1906, Serial No. 300,336. Divided and this application filed November 22, 1907. Serial No. 403,399.

*To all whom it may concern:*

Be it known that I, SVEN GUSTAF WIGELIUS, a subject of the King of Sweden, residing at Eskilstuna, Sweden, have invented certain new and useful Improvements in Gas-Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This application is a division of my application Serial No. 300,336, filed February 9, 1906.

The present invention relates to improvements in gas motors, and has for its object to provide a valve device for use in such motors that are driven by means of liquid fuel in which the fuel is supplied, vaporized and simultaneously mixed with air compressed up to the working pressure of the motor, that is, where a gas air mixture ready for combustion is mixed outside of the cylinder.

By means of a valve device the supply of the fuel is controlled in a well-known manner, so that the speed of supply or the quantity of fuel introduced into the cylinder at each charge is proportional to the speed of the power piston and to the degree of filling.

The invention is particularly adapted to that class of valve devices in which the fuel and air is introduced into the cylinder through one and the same valve, and by means of the valve pumped or forced into the cylinder.

The outlet of the conduit which conducts the fuel to the valve, for instance at the valve seat or some other part connected to the valve, is kept closed until the valve is opened, so that the fuel only at this moment comes into contact with the air in the cylinder, or which has just at that moment been introduced into it. The air entering the cylinder may be given a high temperature without fear of a too early ignition, and besides, the fuel may enter so rapidly that when the power-stroke moves away from the dead-point position the pressure and the temperature cannot sink so as to render ignition difficult, or to hinder it. The conduit inside the valve nearest the valve-seat, which conducts the air and fuel to the valve-seat, is so formed that the quantity of air passing the valve-seat is independent of the valve-stroke, as only the quantity of the fuel introduced into the cylinder is dependent on said valve-stroke.

In the accompanying drawings—Figure 1 is a longitudinal section of a form of a valve device embodying my invention, some of the parts being shown in elevation, and Fig. 2 a modified form of valve.

The device shown in Fig. 1 consists of two valves, 26 and 27, communicating with the same casing, the valve 26 opening into a chamber 51. This chamber communicates by means of a conduit 16 with an air-compressor or a compressed air receptacle, not shown, and through pipe 49 said chamber is supplied with fuel from the fuel supply under pressure, and serves to introduce the mixture of air and fuel into the power cylinder 15. The other valve, 27, communicates with the atmosphere through port 17 and serves to introduce air into the power cylinder through chamber 29 after the combustion in the cylinder and after the expansion of the combustion gases, and thereby clean the cylinder and fill it with air. The valves open in opposite directions, and the means here shown for operating them consists of a cam-roll 18 secured to a moving shaft. The valve 26 has a compound spindle consisting of a pipe 40, and a spindle or rod 41, mounted in said pipe and rigidly connected with the valve, said spindle 41 having at the base a valve-cone 42 which closes the end of pipe 40. A perfect closure between the pipe and the valve-cone is attained by means of a spring 43 surrounding the end of spindle 41, said spring abutting with one end against a flange on the inside of the pipe, and with the other against a plate 44 on the spindle. This plate is placed at a very short distance from the shoulder 45 on the inside of pipe 40, so that the pipe and the spindle can move relatively to each other, so far as said short distance will permit. The pipe 40 is provided with a reduced portion forming a shoulder 46, which is movable in a corresponding bore or chamber 47 in the socket 48 of the valve plug A and into which chamber 47 the fuel conduit 49 discharges. The fuel which is under pressure not only fills the chamber 47 but also the space around the valve-spindle 41, into which space the fuel can enter through an orifice 50 in the wall of pipe 40.

The compound valve spindle is mounted in the valve plug A which in turn is mounted in a seat plug B that is mounted in the end of the combustion cylinder 15. The seat plug carries the flaring valve-seat C whose opening is in alinement with the passage 28, so that the mixed charge, already at ignition pressure, will pass directly through passage 28 into the cylinder. The quantity of mixture admitted is dependent upon the stroke of the valve. Upon the piston reaching the dead-point the valve 26 is closed and the valve 27 simultaneously opened in consequence of the operation of the controlling cam-roll 18. The opening of valve 27 admits air into chamber 29, which air flows through passage 28 and cleans the power cylinder.

With the closing of valve 27, pipe 40 is moved through the action of cam-roll 18, and valve 26, whose stem is connected with the pipe by means of a coiled spring 43, is likewise moved away from the valve-seat. The pipe during this movement closes the outlet of the fuel conduit 49 and the shoulder 46 on the pipe performs the function of a piston and compresses the charge of fuel in the chamber 47. This compressed fuel escapes from the chamber 47 to the interior of pipe 40 through an aperture 50 and acts on the valve-cone 42 so that said cone is forced away from the end of pipe 40 a distance corresponding to the space between plate 44 and shoulder 45, and permits the charge of fuel in the pipe to escape into chamber 51 where said charge is suitably mixed with the compressed air coming through passage 16 and passes thence through the open port of valve 26 into cylinder 15. The conduit 16, serving to conduct compressed air to the chamber 51, is, as shown in the drawing, contracted, and the volume of compressed air supplied to said chamber depends upon the size of the conduit.

According to the modification shown in Fig. 2, the tubular valve-spindle is not provided with a shoulder which serves to conduct the fuel, but coöperates, instead, with a stationary piston 55, projecting into the end. The other end of the tube is formed as a valve-cone and provided with outlets 56 for the fuel, which outlets open against the conical valve-seat. When the spindle 40 is drawn back the fuel-conduit 49 is either closed by means of a valve (not shown) arranged in the pipe 49, or by reason of the opening 57 being closed by the movement of the tube 40 o the left, while the fuel entering through the hollow tubular spindle is pressed out through the openings 56 and carried along, as already described, with the compressed air into the cylinder.

I claim—

1. A valve for combustion engines comprising a valve port leading to the cylinder of the engine, a valve coöperating with the port, a hollow stem closed by the valve, means to permit the valve to move longitudinally and relatively to the stem, means to supply liquid fuel through the stem when the valve is withdrawn from the port and a supply of air controlled by said valve.

2. A valve for combustion engines comprising a valve port leading to the cylinder of the engine, a valve coöperating with said port, a hollow stem closed by the valve, a fuel supply chamber surrounding the hollow stem, said stem having a passage connecting the chamber and interior of the stem, means to permit the valve to move relatively to the hollow stem and a supply for compressed air at the valve controlled thereby.

3. A valve for combustion engines comprising a valve port leading to the cylinder of the engine, a valve coöperating with said port, a hollow stem closed by the valve, means to permit the valve to have movement relatively to its stem, a fuel supply chamber surrounding the stem, said stem having a passage connecting the chamber and interior of the stem, means to move the stem and valve and thereby close said passage and force the fuel through the hollow stem.

4. A valve for combustion engines comprising a valve port leading to the cylinder of the engine, a valve coöperating with the port, a compound stem for the valve comprising a tube having a reduced end and a rod yieldingly connected to the tube and rigidly connected to the valve, an oil supply chamber surrounding the reduced end of the tube, said reduced end having a passage therethrough, a fuel supply pipe for the chamber and means connected to the tube to actuate it and the valve.

5. A valve for combustion engines comprising a valve port leading to the cylinder of the engine having a flaring entrance, a valve coöperating with the port, a compound stem for the valve comprising a tube having a reduced portion and a rod spring held at one end in the tube and rigidly secured at the other end to the valve whereby said valve normally closes the end of the tube; an oil chamber having a supply pipe, a passage through the reduced end of the tube connecting the chamber and interior of the tube, means connected to the tube to operate the valve and an auxiliary scavenging valve controlling compressed air.

6. The combination with a combustion cylinder, of a valve seat plug mounted therein and having a flaring valve seat, a valve plug mounted in the seat plug, and a valve coöperating with the seat and slidably mounted in the valve plug, in combination with means operated by the movement of the valve to deliver a quantity of fuel in rear of the valve at each lift of the valve from its seat, and a chamber behind the valve supplied with air under pressure to carry the delivered fuel into the cylinder.

In testimony that I claim the foregoing as my invention, I have signed my name in presence of two subscribing witnesses.

SVEN GUSTAF WIGELIUS.

Witnesses:
CARL FRIBERG,
K. E. FRIBERG.